(12) United States Patent
Fleming et al.

(10) Patent No.: US 6,689,014 B2
(45) Date of Patent: Feb. 10, 2004

(54) PARK POSITION LOCKING SYSTEM FOR AUTOMATIC TRANSMISSION SHIFTER

(75) Inventors: William R. Fleming, Fort Wayne, IN (US); Trevor T. Downes, Fort Wayne, IN (US); Jeremy A. Lahr, Columbia City, IN (US); Aaron D. Lindsey, Bryant, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/060,598

(22) Filed: Jan. 30, 2002

(65) Prior Publication Data

US 2003/0141130 A1 Jul. 31, 2003

(51) Int. Cl.$^7$ .................. B60K 41/20; B60K 41/26; B60K 17/04; B60K 17/12
(52) U.S. Cl. .................. 477/96; 180/271; 74/473.12
(58) Field of Search ............... 477/96, 99, 97; 180/271; 74/473.1, 473.12, 473.13

(56) References Cited

U.S. PATENT DOCUMENTS

| | | | | |
|---|---|---|---|---|
| 4,295,540 A | * | 10/1981 | Hildebrecht | 477/96 |
| 5,489,246 A | * | 2/1996 | Moody et al. | 477/96 |
| 5,647,818 A | * | 7/1997 | Moody | 477/96 |
| 5,778,330 A | * | 7/1998 | McKee | 477/99 |
| 5,853,348 A | * | 12/1998 | Lehman | 477/96 |
| 5,862,899 A | * | 1/1999 | Dahlstrom | 477/96 |
| 6,007,451 A | * | 12/1999 | Matsui et al. | 477/99 |
| 6,059,687 A | * | 5/2000 | Durieux et al. | 477/96 |
| 6,295,887 B1 | * | 10/2001 | DeJonge et al. | 477/99 |
| 6,500,092 B2 | * | 12/2002 | Syamoto | 477/99 |

* cited by examiner

Primary Examiner—Tisha D Lewis
(74) Attorney, Agent, or Firm—Jeffrey P. Calfa; Dennis Kelly Sullivan; Susan L. Lukasik

(57) ABSTRACT

This invention is an improved park position locking system for controlling the conditions for removing an automatic transmission gearshift 90 from a PARK position. An electronic system controller 30 and the transmission controller 16 are engaged to a common data bus 18. Vehicle control system 10 comprises the electronic system controller (ESC) 30, which is the primary component of a vehicle electronic control system. ESC 30 manages and communicates with a number of vocational controllers disposed on a vehicle 13 and executes a load management program which oversees the total load imposed on the vehicle electrical system and power train by various accessories installed on the vehicle 13. Such communication is by a standard communication protocol that may be the SAE J1939 protocol over the common data bus 18. The ESC 30 is programmed to ensure that an operator of the vehicle may not move the gearshift 90 out of a PARK position without first depressing a service brake pedal. The ESC 30 prevents or allows movement of the gearshift through a solenoid operated locking mechanism engaged to the gearshift 90.

4 Claims, 4 Drawing Sheets

PARK POSITION LOCKING SYSTEM FOR AUTOMATIC TRANSMISSION SHIFTER

BACKGROUND

This invention relates to mobile vehicle automatic transmissions, transmission shifters, and vehicle communication sub-systems. The communication sub-system makes use of existing industry standard or proprietary communication protocols and communication spines replacing separate hard wired circuits for ensuring that the shifter is not moved out of a park position without the application of service brakes. Such vehicles appropriate for such installation include but are not limited to light, medium, and heavy-duty trucks and buses.

PRIOR ART

Many transmission shifters have a position labeled "Park" or labeled with some abbreviation of "park" or similar word that is meant to operate some device to halt the vehicle's forward and reverse motion. The driveline of a vehicle transmits power first from the engine and eventually to the wheels and road. Some transmissions have a built in "park pawl" that locks the driveline through a ratchet-like mechanism, while other transmissions have a device that automatically actuates the vehicle's park brake. In either case, an injury could potentially occur if the transmission is shifted out of this park position to free the transmission or release the park brake without some other means of impeding the vehicle's forward or reverse progress.

One way to avoid sudden, perhaps unexpected, vehicle movement is to disallow the operator to shift the transmission out of this "park" position until the service brakes have been applied. U.S. Pat. No. 5,853,348 owned by the same assignee as this invention provided such a system. This prior art system was for selectively locking a steering-column-mounted transmission shifter in a park position that places the transmission in one of two neutral positions. An electrically operated shift lock releasably locked the shifter in park position. The shift lock was under the control of an electric circuit that contained a first and second shift lock relays having normally open contacts connected in series to the shift lock. The electric circuit operatively coupled the relays' coils with the ignition switch, a transmission neutral position-sensing switch, and a service brake-sensing switch. When the service brakes were applied and the ignition switch was on, the shift lock was operated to release the shifter, allowing the shifter to be moved to other positions. This system while effective involved complexity with the two separate relays and two sensing switches.

One issue with mobile vehicle electronics is managing communication between on-board controllers or electrical agents. At a simple level, communication between two electrical agents may be kept physically separated from communications occurring among other agents. Where two or more signals do not use the same physical space, there is no need to separate the signals in time or in carrier wave frequency. Such a communications regime is sometimes termed as physical division multiplexing although the term multiplexing is usually reserved to techniques for applying multiple signals to a single medium or physical space. So-called physical division multiplexing describes how motor vehicles have been traditionally wired. The use of separate dedicated wires to connect each switch and lamp is a type of physical division multiplexing. Obviously, physical division multiplexing, while simple in concept, results in the use of many wires (the classical motor vehicle electrical harness), which are difficult to install during manufacturing and problematic to maintain in the field.

Arrangements allowing a number of agents to communicate over a common physical layer or medium offer much greater physical simplicity. Intelligible communication between two or more devices among a greater plurality of devices, all over a common medium, depends upon the communicating devices being able to distinguish, and understand, messages directed to them from other messages which they receive, but which are not intended for them. The process of distinguishing messages depends upon the transmitter of the message applying some attribute to the message that identifies it to the intended recipient. In human conversation, most people readily distinguish speech directed to them from interfering cross talk in a crowd by the distinctive aspects of the voice of the person addressing them. Where the members of the group are electrical components, the problem still involves identification of a distinguishing attribute of the signal. Appropriate attributes for signals take a number of forms.

A line communicating a signal from a remote switch to a lamp to turn on or off (by having a second switch, local to the lamp, change states to control connection of the lamp between a power bus and ground) cycles only rarely. In a typical trip such a change in state occurs only once or twice, if at all. Where such a line is not intended to provide power to the lamp, and simply indicates changes in state for the local switch controlling the lamp, the line will have the capacity to handle far more data than the occasional indications to turn a lamp on and off. The objective of maintaining simplicity in manufacturing and maintenance are preferably met by allowing communication among a number of components to occur in a single medium, or at least as few communication lines as possible. The line used to connect switch and lamp could interconnect a number of components, carrying messages between any groupings of elements connected to the line when not required to carry an instruction to a lamp to turn on. One way of achieving this objective is a communications regime that divides time into slots during which particular combinations of components have use of a signaling line. Such methods are well known in the art and are examples of time division multiplexing (TDM). In motor vehicles, time division and related multiplexing techniques offer substantial simplification in physical layer required to support the control of vehicle vocations.

Rigid time division multiplexed communications appear to interleave data signals into a single serial signal over a single physical medium. Multiplexed communication systems also provide the reverse function (de-multiplexing) of dividing the single signal into multiple, non-synchronous digital signals. Where demands on the capacity of the data transmission medium are not especially heavy, any unit may be allowed to claim the medium provided collision detection is provided for and other indicia, such as address headers, indicate the signal's destination.

As applied to motor vehicles, multiplexed communications over serial data paths are an effective technique for reducing the number of dedicated communication paths between the numerous switches, sensors, devices and gauges installed on the vehicles. With each increase in the number and variety of accessories and functions installed on each vehicle, the benefits of using a single, multiplexed communication serial link for passing instructions to and receiving information from vehicle devices as diverse as running lights and rear axle temperature sensors becomes greater. Multiplexing the signals to and from local controllers and switches for vehicle systems promises greater physical simplicity through displacing much of the vehicle wiring harness, reducing manufacturing costs, facilitating vehicle electrical load management, and enhancing system reliability.

The specific manner of implementing multiplexed communications is outside the scope of the present invention, which applies a defined protocol such as the SAE J1939 protocol. Additionally, proprietary protocols may be used although over a network similar to as described here. The development by the Society of Automotive Engineers of the J1939 series of standards for multiplexed communications testifies to the progress in the application of multiplexed communications to vehicles. Standards have been or are being developed relating the communication path, transmission collision detection, diagnostic ports and data protocols, among other topics. The J1939 protocol provides an open protocol and definition of the performance requirements of the medium of the physical layer, but also allows for development of proprietary protocols. The SAE J1939 protocol is a specialized application of a controlled area network (CAN) and may be readily implemented utilizing commercial integrated circuits such as the C167 Integrated Circuit from Siemens of Germany.

A serial communications system utilizing a multiplexing regime can link several remote digital controllers positioned around a vehicle with an electrical system controller or electronic system controller (ESC) for two-way communication. Remote digital controllers are addressable, allowing them to respond to signals intended for them initialize particular functions. The transmission ECM may be a remote digital controller. They may also include programming that allows the device to react to local conditions as well as condition indicating signals provided the controller. The ESC may pass requests and instructions received for operations of certain devices, addressed to the correct remote controller, in a fashion to condition the timing and duration of the responses to requests to better manage overall vehicle electrical load.

What is needed and does not exist in the prior art is an improved park position locking system for an automatic transmission shifter or a vehicle with such a system that disallows the operator from shift the transmission out of a "park" position until the service brakes have been applied and manages this interlock over a multiplexed communication network or backbone without the need for separate relays and sensors.

SUMMARY

An object of the invention is to provide an improved park position locking system for an automatic transmission shifter or a vehicle with such a system that disallows the operator from shift the transmission out of a "park" position until the service brakes have been applied and manages this interlock over a multiplexed communication network or backbone without the need for separate relays and sensors. This should at a minimum save on the cost and complexity of having the separate relays and sensors. A second object of the invention is to provide for communications between the gearshift and the electronic transmission without the need for a dedicated electrical communication line.

The transmission and gearshift communication subsystem and vehicle with the subsystem installed of this invention satisfies all the objects of the invention and others not mentioned. Rather than have separate relays and sensors for ensuring that an operator can not move a shifter out of a a PARK position without applying service brakes, the communication subsystem of this invention involves electrically connecting both the gearshift, the ESC, and the transmission ECM to a common vehicle network. The ESC or the network will include a sensor for brake pedal position. The network may allow communication by an industry standard, such as J1939, or by a proprietary protocol. The key point is that the ESC, the gearshift, and transmission ECM are both tied into a common network to communicate using a standard protocol and that the ESC is programmed to query the status of the brake pedal, query the status of the transmission, and finding the brake pedal depressed and the transmission in PARK, the ESC will send a signal to activate a solenoid in the gearshift to release a Park position locking mechanism to allow the operator to move the gear shifter out of a Park position. Otherwise the ESC will provide signal to the solenoid in the gearshift to continue to engage the Park position locking mechanism. These queries and signals will be under a standard multiplexing protocol. There may be other digital controllers engaged to the network for communication. No special relays or dedicated line between the gearshift and the transmission will be required.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
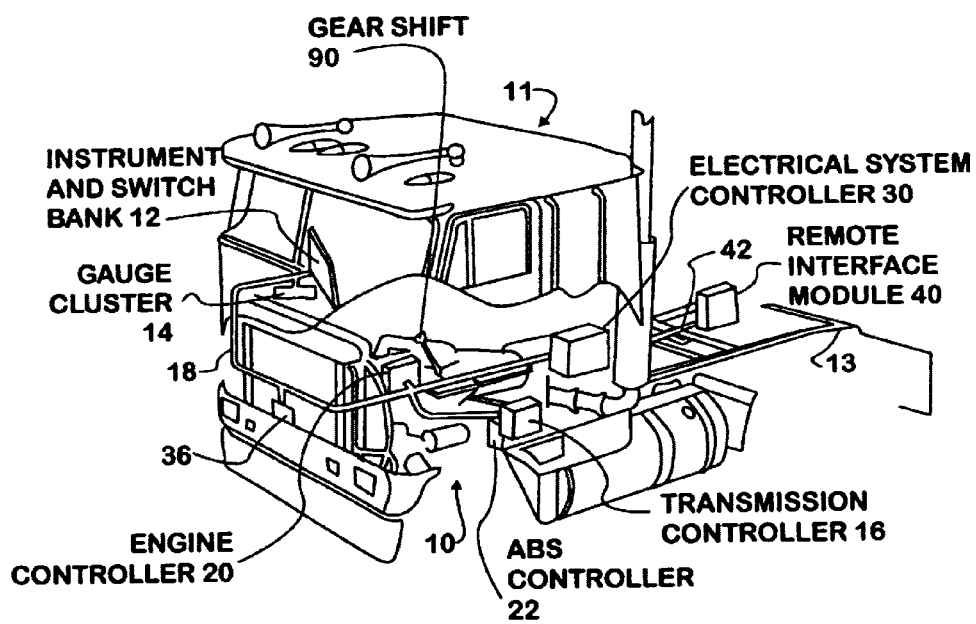
FIG. 1 is a perspective view of a vehicle electrical system.
Figure 2:
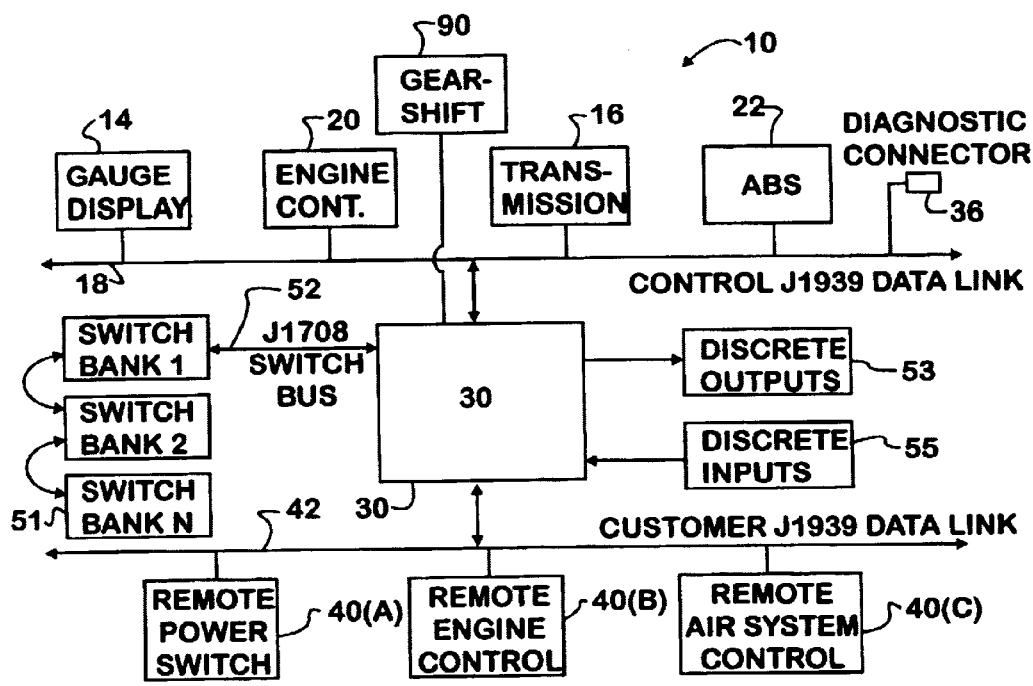
FIG. 2 is a high level block diagram of the control network for a vehicle.

The improved park position locking system for an automatic transmission shifter in is its most basic form includes an electrical or electronic system controller (ESC) 30, a gearshift 90, a transmission 16a and an electronic transmission controller 16, and a common data bus 18. The gearshift 90 communicates with the transmission controller 16 to change gears or mode of operation of the transmission for automatic transmissions over an actuator cable or other communication line 92. FIG. 1 is a perspective view of a vehicle electrical system 10 installed on a vehicle 13. The vehicle electrical system 10 includes the ESC 30, which is the primary component of a vehicle electronic control system. The ESC 30 is engaged to the common data bus 18. The ESC 30 may manage and communicate with a number of vocational controllers disposed on vehicle 13 and may execute a load management program which oversees the total load imposed on the vehicle electrical system and power train by various accessories installed on the vehicle 13. Such communication is through a standard communication protocol that may be the SAE J1939 protocol over the common data bus 18. Most active vehicle components are directly controlled by one of a group of autonomous, vocational controllers, which include a gauge cluster 14, an engine controller 20, a transmission controller 16, an auxiliary instrument and switch bank 12, and an antilock brake system (ABS) controller 22 all of which are connected to ESC 30 over the common data bus which may be a serial data bus or link 18. This is shown in FIG. 2. The autonomous controllers include local data processing and programming and are typically supplied by the manufacturer of the controlled component. The serial data link 18 may be a twisted pair cable constructed in accordance with SAE standard J1939 and may be externally accessible via a diagnostic port 36. Although the autonomous controllers handle many functions locally and are functionally different without reference to ESC 30, they report data to ESC 30 and can receive operational requests from ESC 30. The alternative common data bus 18 may operate using proprietary communication protocol other than an industry standard.

The engine controlled by the engine controller 20 of the vehicle 13 is engaged to a chassis of the vehicle 13 shown in FIG. 1. The transmission 16a of the vehicle 13, controlled by the transmission controller 16, is also engaged to the chassis of the vehicle 13.

A second serial data link 42 may extend from the ESC 30 back to a remote interface module (RIM) 40. Remote interface module 40, similarly to the autonomous controllers, provides local control signals to electrical devices constituting or controlling loads installed on vehicle 13. While remote interface module 40 has data processing capability, it typically includes minimal local programming and is dependent on and functionally specified by signals received over the second serial data link 42 from ESC 30 for operation. Hence RIMs 40 are herein termed dependent controllers.

The loads imposed on vehicle 13 systems controlled by electrical control system 30 are usually electrical loads, however, they may include electronically controlled engagement of mechanical devices to the power train of vehicle 13. Gear selection in an automatic transmission would be an example of such an arrangement. Other electrically controlled non-electrical loads can include control of a clutch for an air conditioning compressor, or actuation of pumps driven by the vehicle drive train. The load management program can, depending on power demands by components, including accessories controlled by a RIM 40, request increased power output from the engine through engine controller 20.

Gauge cluster 14, transmission controller 16 and engine controller 20, and a service brake applied switch 19 all may communicate with electronic system controller 30, which also monitors inputs received from the auxiliary instrument and switch bank 12, over the serial communication link in harness 18. Electronic system controller 30 may be programmed to override the normal response characteristics of the gauge cluster 14, transmission controller 16 and engine controller 20, should electrical and mechanical loads exceed the capacity of the vehicle, should requests conflict with one another, and under other circumstances.

A RIM 40 is a general-purpose control interface allowing the attachment of various accessories to vehicle 13. RIM 40 provides a plurality of ports providing for each of the following: analog inputs; analog outputs; digital inputs; and digital outputs. Characterization of a particular port as, for example, an output port, does not necessarily mean that it functions exclusively as an output port. For example, an output port may include voltage drop sensing elements, current flow sensing elements, or both, allowing determination by ESC 30 of whether, for example, a bulb in a lamp connected to the output port is operative, or whether a short circuit condition exists in an attached device.

FIG. 2 is a schematic illustration of the vehicle control system 10. ESC 30 communicates with local vocational controllers over one of two major SAE J1939 serial data links 18 and 42. The J1939 standard provides for both an open protocol and a proprietary protocol, which differ in the formatting of information transmitted over the serial data links. Accordingly, serial data links 18 and 42 may use the same or different communication protocols. Controllers for substantially common vehicle components such as transmissions, engines and the like communicate with ESC 30 over serial data link 18, which utilizes a open protocol. A diagnostic connector 36 taps into serial data link 18 over which portions of the programming of ESC 30 may be overwritten. In the illustrated embodiment three remote interface modules are monitored and controlled by the ESC 30 over serial data link 42 to function as a remote power switch 40(A), a remote engine controller 40(B) and a remote air control system 40(C). The specific functions of the several remote interface modules are unimportant and are given as examples only. Disposition of the control of major vehicle drive train components, the vehicle gauge cluster and the diagnostic port 36 onto serial data link 18, and the provision of a second serial data link 42 for carrying communication among the definable, dependent controllers (remote interface modules 40) segregates major vehicle elements in a protected partition via link 18 which is isolated from operator defined functionality implemented over serial data link 42.

ESC 30 also provided from monitoring several bi-state switches in a group of switch banks 51 over a relatively low baud rate SAE J1708 data link 52. ESC 30 can also be directly connected to several devices and sensors directly, which are grouped as discrete outputs 53 and discrete inputs 55.

The ESC 30 includes a fixed number of interface connections for reading bi-state (i.e. on/off) switches. These inputs are appropriate for reading warning light sensors that typically provide a vehicle ground connection to indicate that the sensor is in an active state. The sensor to indicate an inactive state provides an open circuit connection. Another collection of inputs labeled analog inputs. These inputs are subject to sampling, analog to digital conversion and storage as a representative binary value in volatile random access memory section of memory for further processing. The service brake applied switch 19 may be one of these bi-state switches. The service brakes are those that the operator applies by pedal operation to reduce the vehicle's 13 velocity during operation. The service brake applied switch 19 may be directly off of a brake pedal 19a or otherwise providing the state of the service brakes being applied or not applied. The service brake applied switch or transducer 19 may be capable of changing signal levels (voltage levels) dependent upon the state of the brake pedal 19a (depressed or not depressed).

The transmission controller 16 monitors transmission 16a position or mode either directly or indirectly through transmission position sensor or transducer 17.

Figure 3:
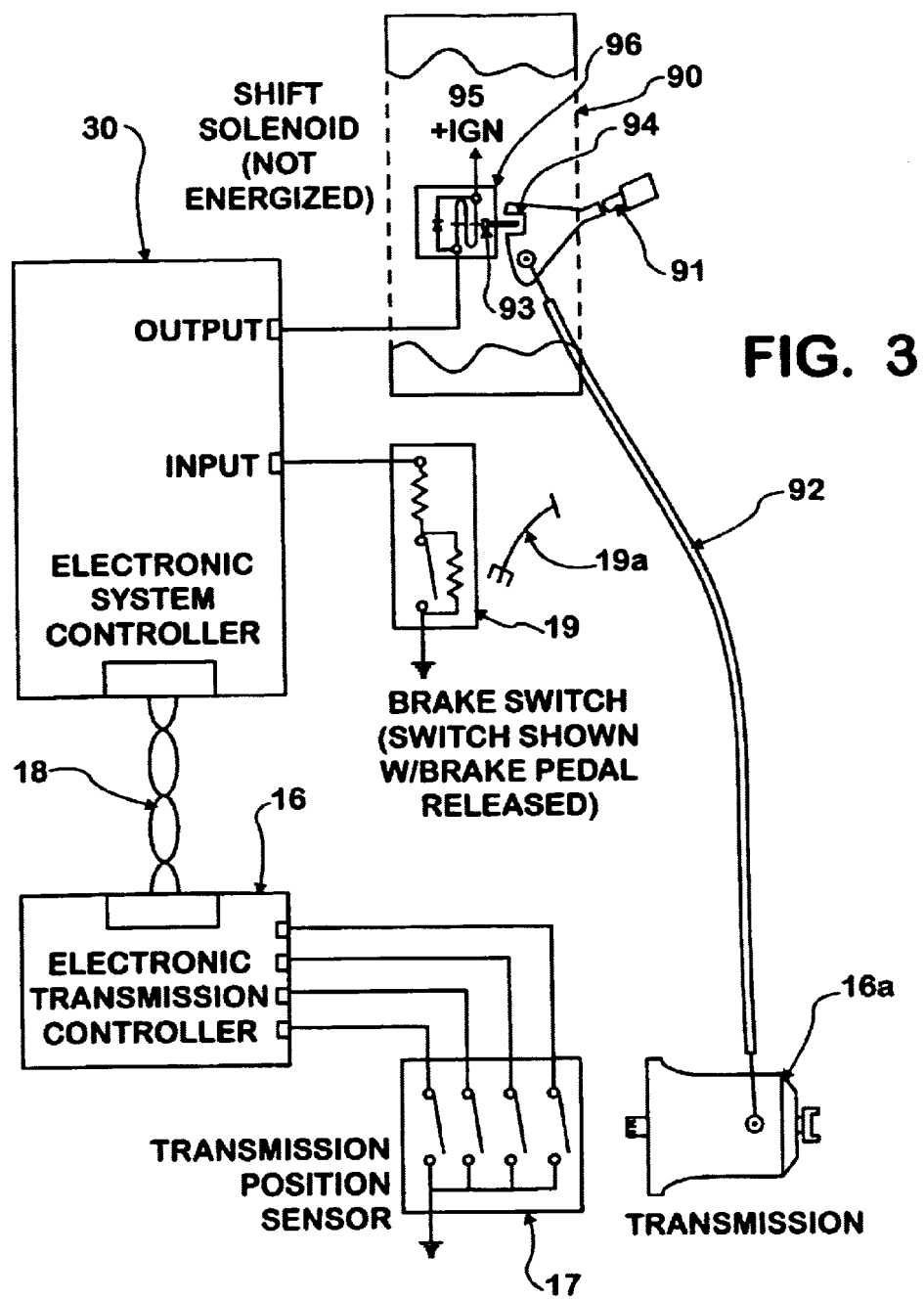
FIG. 3 is a basic form diagram of the present invention.

The basic system is shown in FIG. 3 with more detail shown of the gearshift 90. The ESC 30 may also monitor the position of the ignition switch circuit 95 directly or through the shift solenoid 96. Although the ESC 30 described and shown is the main electronic system controller, any electronic controller on the vehicle 13 in communication with the transmission controller 16 over the common data bus 18 may serve as the programmed and controlling entity for this invention. As mentioned earlier the gearshift 90 is engaged through the communication line 92 to operate and change modes of the transmission 16a. The ESC 20 is electrically engaged to a shift solenoid 96 that is engaged to or part of the gearshift 90. The shift solenoid 96 operates a locking mechanism 93 that engages a notch or slot or hole 94 in a gearshift handle 91 of the gearshift 90. The locking mechanism 93 may comprise a pawl or male plunger for insertion into the notch slot or hole 94. The locking mechanism 93 either locks the gearshift handle 91 in a PARK position or when the locking mechanism 93 is disengaged the gearshift handle 91 may be positioned to another position. The solenoid 96 in the preferred embodiment, described below, will engage the locking mechanism 93 when de-energized and disengage the locking mechanism 93 when energized. This may be reversed in other embodiments.

Figure 4:
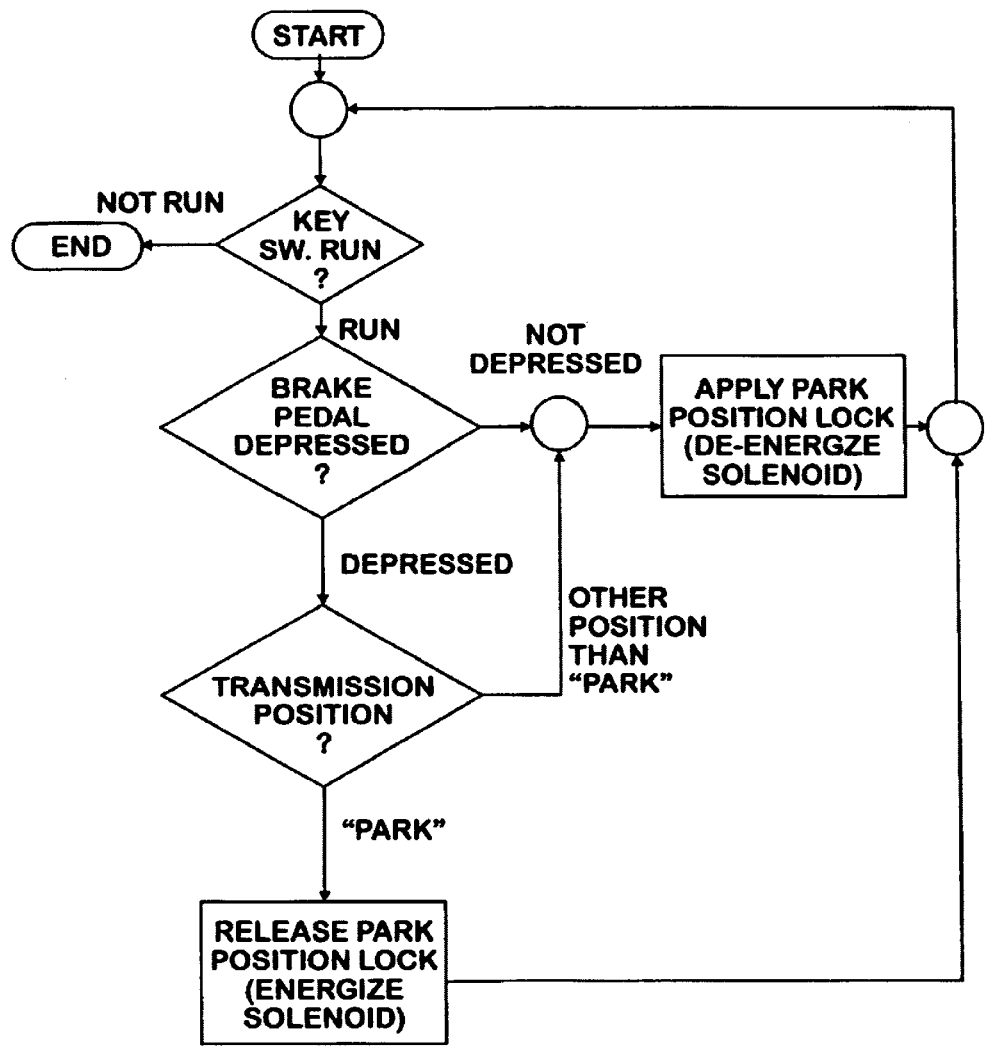
FIG. 4 is a flow diagram of the programmed logic of the invention.

The preferred embodiment of the programmed logic of the ESC 30 is shown in FIG. 4. The invention uses two pieces of data. These are the position of the service brake pedal 19a (whether it is depressed or not depressed) and the position of the gearshift handle 91 (which could be "PARK," "REVERSE," "NEUTRAL," "DRIVE," or one of several other positions). From this data, some logical device (which could be an electronic system controller 30, as pictured in the drawing above), which is programmed to evaluate the data according to the algorithm shown in FIG. 4, will determine the next course of action. If the brake pedal 19a is depressed or the service brake system is otherwise detected as having been applied, and the transmission 19a is in the "PARK" position, then the output is energized, effectively releasing the locking mechanism 93 and therefore the park position locking system. If both of these circumstances are not met, the solenoid 96 is not energized, which locks the transmission 16a from being shifted out of the PARK position if the transmission 16a is already in the PARK position. If the transmission 16a is not in the PARK position, the gearshift handle or lever 91 is generally set up to only lock the lever 91 once the lever 91 is placed in the PARK position.

Another feature is that the algorithm is tied to the transmission 16a position. This is not necessarily needed, since just relying on the brake pedal 19a input (depressed or not depressed) or service brake applied input is enough to supply the level of safety needed to ensure that the vehicle 13 is not exposed to sudden, inadvertent motion. The transmission 16a position is important, however, due to the limited durability of the solenoid 93 that engages and disengages the locking mechanism 93 of the park position lock subsystem. If the solenoid 93 was repeatedly energized and de-energized during stop-and-go-traffic, the solenoid 93 would fail prematurely. Ensuring that the solenoid 93 only operates when the transmission 16a needs to be shifted from PARK eliminates this concern.

Likewise, since the interlock shift solenoid 93 is wired to the ignition circuit 95 or the ESC monitors the ignition 95, and most devices such as the electronic system controller are set up only to operate when the ignition circuit is active, the system as depicted in this invention submission is only set up to run in the "ignition" or "run" key switch position. The system would provide the same level of safety needed to ensure that the vehicle 13 is not exposed to sudden, inadvertent motion even if the system operated in any key switch position, but only allowing the system to operate when the ignition switch of the ignition circuit 95 is in the "ignition" or "run" position ensures that the vehicle's 13 battery is not overly taxed when the vehicle's 13 engine is not running (perhaps draining the battery to the point where the vehicle's 13 engine cannot be restarted).

The ESC 30 or other programmed controller for managing this functionality may be programmed as shown in FIG. 4. The controller queries whether the ignition 95 is in a RUN position. The controller also queries if the brake pedal 19a is depressed or if the service brakes are applied. The controller also queries if the transmission 16a is in a PARK position. If the ignition 95 is in RUN, the service brakes are applied, and the transmission is in PARK, the controller will provide signal to the solenoid 93 controlling the locking mechanism 93 to allow movement of the gearshift handle 91 out of PARK. In the preferred embodiment the signal to the solenoid 93 will be to energize. If any of the above three conditions are not met, the system will signal the solenoid 93 to maintain the locking mechanism 93 in a locked position. Once again, in the preferred embodiment if the three conditions are not met, the solenoid 96 is kept deenergized.

The main reason this solution is superior to previous implementations is that the vast majority of the components involved in the system are already on the vehicle 13 for other reasons. In fact, the only new components are the parts that go into the shifter interlock, and a few electrical circuits for energizing the solenoid 96 based on the system controller 30 output (which is already on the vehicle 13 as well). The electrical system 10 is reconfigured to energize/de-energize the park position interlock mainly by adding the software needed to decode the signals already present in the vehicle's electrical system 10. This solution uses an absolute minimum number of additional components to provide the same level of performance as previous solutions.

Another reason why this invention is better than previous implementations (see U.S. Pat. No. 5,853,348) is that it is capable of distinguishing between "PARK" and "NEUTRAL" transmission positions. Previous implementations were developed for non-electronically-controlled transmissions, and in order to obtain transmission position information, were "hard-wired" to the "neutral position switch." These transmissions also did not include the option of a "park pawl" and the "park" position was often called the "second-neutral" position, since to the transmission, the additional position was nothing more than a second neutral position. These "double-neutral" transmissions only had the option of automatically applying the park brake when the transmission was shifted into the "second-neutral position." Furthermore, the "neutral position switch" mentioned earlier did not have the capability of distinguishing between the first and second neutral position, and when the park position lock system was wired to this switch, it was energized in both neutral positions. Since the invention listed in this submission form is used with electronically controlled transmissions, it has the ability to distinguish between the "park" position and the "neutral" position, and only energizes the park-position lock system when the transmission is in the "park" position. This keeps the solenoid 96 from being energized unnecessarily, such as when the transmission is shifted from "REVERSE" to "NEUTRAL" to "DRIVE", or from "DRIVE" to "NEUTRAL" to "PARK." This should decrease the number of times the solenoid is operated by half, producing a system that lasts twice as long.

As described above, improved park position locking system for an automatic transmission shifter with the electronic system controller (ESC) 30, a gearshift 90, a transmission 16a and an electronic transmission controller 16, and a common data bus 18 and vehicle 13 with the system installed provide a number of advantages, some of which have been described above and others of which are inherent in the invention. Also modifications may be proposed to the improved park position locking system and vehicle 13 with the system installed without departing from the teachings herein.

We claim:

1. A park position locking system for an automatic transmission shifter for a mobile vehicle, the vehicle having a chassis and an operators cab, the vehicle having an automatic transmission engaged to a chassis of the vehicle for driving an axle, the transmission engaged to an engine of the vehicle, and the engine engaged to the chassis of the vehicle, comprising:

a vehicle electrical system with a common data bus;

an electronic system controller electrically engaged to communicate on said common data bus through a standard multiplexing communications protocol;

said electronic controller is an electronic system controller of the vehicle for managing an engine controller of the vehicle;

a transmission controller engaged to the transmission to control and monitor transmission operation and mode;

said transmission controller electrically engaged to said common data bus to communicate along said common data bus through a standard communications protocol;

a service brake applied switch in communication with said electronic system controller;

a gearshift, located within the cab;

said gearshift for changing transmission operating mode, one mode being a PARK mode;

a shift solenoid engaged to a gearshift handle of said gearshift, said shift solenoid engaged to a locking mechanism for locking and unlocking said gearshift handle;

said locking mechanism comprising a male plunger that inserts into a hole in said gearshift handle upon locking;

said electronic system controller in electrical communication with and for controlling said shift solenoid;

said electronic system controller in electrical communication with a vehicle ignition circuit for detecting whether said vehicle ignition is in a RUN mode; and said electronic system controller programmed to send a signal to said shift solenoid to operate said locking mechanism to unlock said gearshift handle allowing said gearshift handle to be moved out of PARK mode when said vehicle ignition is in RUN, said service brake is applied, and said transmission operating mode is PARK mode; and said electronic system controller programmed to send a signal to said shift solenoid to operate said locking mechanism to lock said gearshift handle in PARK if said gearshift handle is in PARK or subsequently moved to PARK when said vehicle ignition not in RUN, said service brake not being applied, or said transmission operating mode not being in PARK.

2. The park position locking system of claim 1, wherein:

said electronic system controller in electrical communication with said vehicle ignition circuit through said shift solenoid.

3. The park position locking system of claim 2, wherein:

said service brake applied switch is engaged to service brake pedal, depression of which provides indication of service brakes being applied.

4. A mobile vehicle in combination park position locking system, comprising:

a chassis;

an operators cab engaged to said chassis;

a transmission engaged to said chassis for driving an axle;

said transmission engaged to an engine;

said engine engaged to said chassis;

a vehicle electrical system with a common data bus;

an electronic system controller electrically engaged to communicate on said common data bus through a standard multiplexing communications protocol;

said electronic controller is an electronic system controller of said vehicle for executing a load management program which oversees total load imposed on said vehicle electrical system and power train;

a transmission controller engaged to the transmission to control and monitor transmission operation and mode;

said transmission controller electrically engaged to said common data bus to communicate along said common data bus through a standard communications protocol;

a service brake applied switch in communication with said electronic system controller;

a gearshift, located within said cab;

said gearshift for changing transmission operating mode, one mode being a PARK mode;

a shift solenoid engaged to a gearshift handle of said gearshift, said shift solenoid engaged to a locking mechanism for locking and unlocking said gearshift handle;

said locking mechanism comprising a male plunger that inserts into a hole in said gearshift handle upon locking;

said electronic system controller in electrical communication with and for controlling said shift solenoid;

said electronic system controller in electrical communication with a vehicle ignition circuit for detecting whether said vehicle ignition is in a RUN mode; and said electronic system controller programmed to send a signal to said shift solenoid to operate said locking mechanism to unlock said gearshift handle allowing said gearshift handle to be moved out of PARK mode when said vehicle ignition is in RUN, said service brake is applied, and said transmission operating mode is PARK mode; and said electronic system controller programmed to send a signal to said shift solenoid to operate said locking mechanism to lock said gearshift handle in PARK if said gearshift handle is in PARK or subsequently moved to PARK when said vehicle ignition not in RUN, said service brake not being applied, or said transmission operating mode not being in PARK.

* * * * *